United States Patent Office.

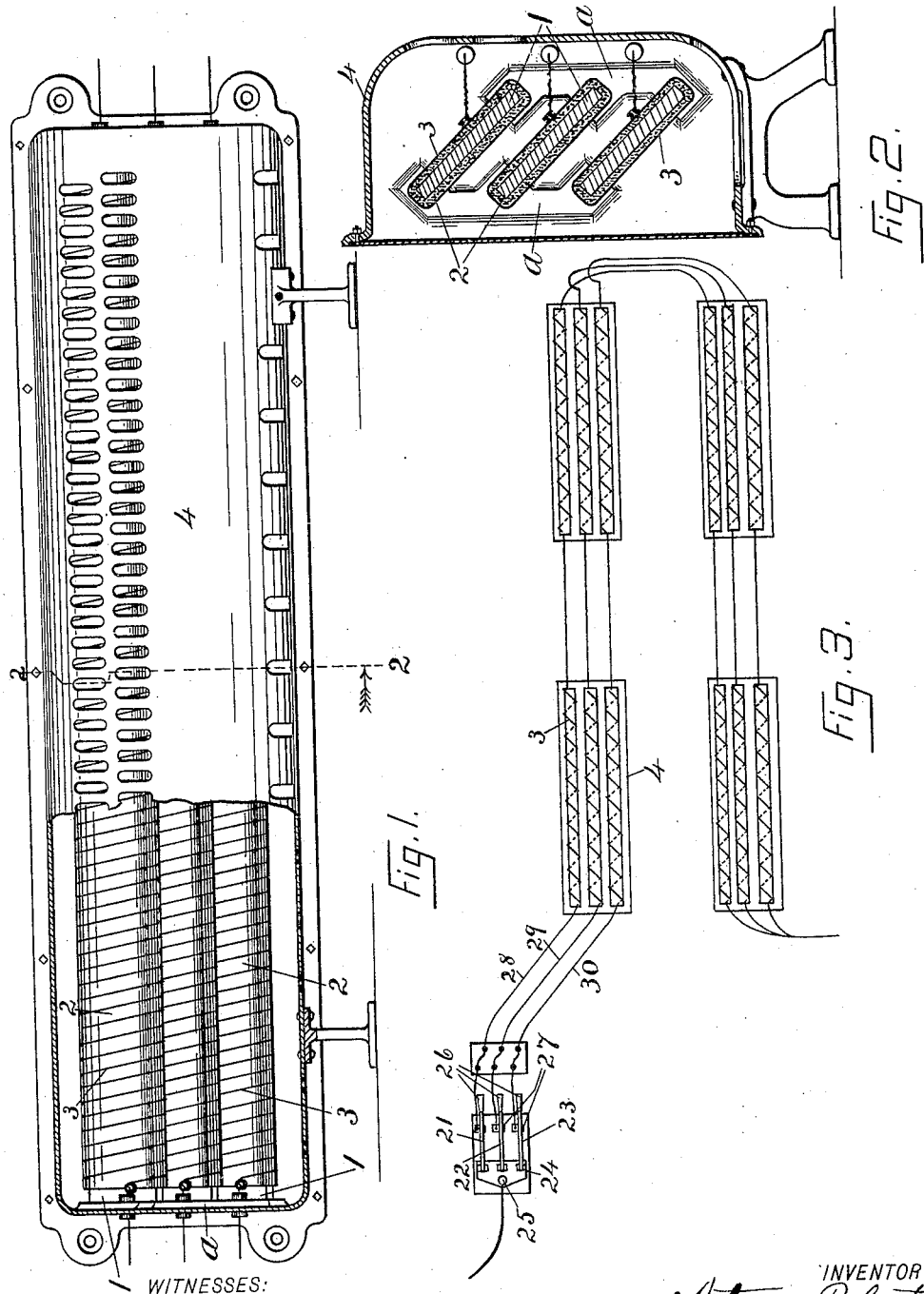

ARTEMAS ROBERTSON, OF TAUNTON, MASSACHUSETTS, ASSIGNOR, BY DIRECT AND MESNE ASSIGNMENTS, TO PATRICK T. CREED, OF SAME PLACE.

ELECTRIC HEATING APPARATUS.

SPECIFICATION forming part of Letters Patent No. 576,766, dated February 9, 1897.

Application filed April 5, 1895. Serial No. 544,552. (No model.)

*To all whom it may concern:*

Be it known that I, ARTEMAS ROBERTSON, of Taunton, in the county of Bristol and State of Massachusetts, have invented a new and useful Improvement in Electric Heating Apparatus, of which the following is a specification, reference being had to the accompanying drawings, in which—

Figure 1 is an elevation, partly in section, showing one of my radiators composed of a casing with three thin metallic bars, each with its heating-coil insulated from it. Fig. 2 is a section on line 2 2 of Fig. 1, but on a slightly larger scale. Fig. 3 is a diagram of a heating apparatus composed of a set of heaters connected for use on a trolley-car and showing also the switch connection with the trolley and the rail of the track.

My invention is an electric radiator made up of a casing perforated at its bottom and along its upper front portion and containing a plurality of electric heating-bars, each made up of a wide thin bar of metal, with an insulating-covering wrapped with a heating-coil, the heating-bars slanting upward and inward across the casing, in order that the air-currents through the lower perforations shall be deflected against the unperforated back of the casing and compelled to flow up back of the heating-bars and over the upper heating-bar to the upper perforations in the front of the casing, the object being to thoroughly heat the air by causing it to eddy about the heating-bars before it is allowed to escape from the casing.

In the drawings the reference-number 1 designates a wide thin bar of iron which is wrapped or covered with asbestos paper 2. Wound upon this wrapper is an uninsulated wire 3, of German silver. The casing 4 is of metal perforated along its under and upper portions, as shown in Figs. 1 and 2. The switch is composed of three levers 21, 22, and 23, which are hinged to an insulating-plate 24, having a binding-post 25, with which the line-wire is connected. These levers are furnished with handpieces 26, of insulating material, by which they may be safely grasped by the operator, and are adapted to be engaged with and disengaged from the spring-keepers 27, which are connected with the connecting-wires 28, 29, and 30, so that when all the levers are in contact with their keepers all the heating-coils will be in operation. The ends of the bars 1 are supported by the ribs *a* upon the end walls of the perforated casing 4, which with the bars 1, wrappers 2, and coils 3 constitute my heating apparatus. These ribs *a* are slanted, as shown in Fig. 2, to hold the heating-bars in a slant upward and inward across the casing, so that the air which flows through the lower perforations will be deflected toward the back of the casing and between the heating-bars and caused to eddy in the casing about the heating-bars before it escapes through the upper perforations.

In Fig. 3 I have indicated four of my improved radiators with three heating-bars in each arranged in series and controlled by the switches 21 22 23, each switch controlling one series, this being an arrangement of my radiators particularly adapted to heating trolley-cars, as it affords a very wide range in effective heating-power.

What I claim as my invention is—

An electric radiator composed of a casing perforated at its bottom and along its upper front portion; a plurality of heating-bars each made up of a wide thin bar of metal, an insulating-covering and a heating-coil; and supports to hold each bar on a slant upward and inward across the casing all arranged to cause the air flowing through the lower perforations of the casing to be deflected against the back of the casing and to eddy about the heating-bars before escaping through the upper perforations in the front of the casing.

ARTEMAS ROBERTSON.

Witnesses:
   J. E. MAYNADIER,
   M. W. MAYNADIER.